United States Patent [19]
Piesinger

[11] Patent Number: 5,579,710
[45] Date of Patent: Dec. 3, 1996

[54] BOAT DOCKING METHOD AND APPARATUS

[76] Inventor: Gregory H. Piesinger, 6225 E. Saguaro Vista Ct., Cave Creek, Ariz. 85331

[21] Appl. No.: 527,262

[22] Filed: Sep. 12, 1995

[51] Int. Cl.⁶ ................................................ B63B 21/16
[52] U.S. Cl. ......................... 114/230; 114/246; 114/254; 254/332; 254/362
[58] Field of Search ....................... 114/230, 254, 114/344, 263, 246; 280/414.1; 242/229, 387, 390.8, 390.9; 254/219, 262, 332, 362; 414/494, 559; 89/1.34

[56] References Cited

U.S. PATENT DOCUMENTS

| | | | |
|---|---|---|---|
| 530,525 | 12/1884 | Hoekstra | 89/1.34 |
| 2,836,921 | 6/1958 | Lynch | 242/229 |
| 3,278,160 | 10/1966 | Sallow | 254/362 |
| 3,474,922 | 10/1969 | Wood et al. | 414/559 |
| 3,801,071 | 4/1974 | Barron | 114/254 |
| 3,844,430 | 10/1974 | Thompson | 114/230 |
| 4,077,349 | 3/1978 | Paul | 89/1.34 |
| 4,231,551 | 11/1980 | Ikeda | 254/362 |
| 4,784,035 | 11/1988 | Fishfader et al. | 89/1.34 |

FOREIGN PATENT DOCUMENTS 970331  7/1975  Canada .................. 414/494

*Primary Examiner*—Sherman Basinger
*Attorney, Agent, or Firm*—Parsons & Goltry; Robert A. Parsons; Michael W. Goltry

[57] ABSTRACT

A method and apparatus for docking a motorboat including providing boat docking apparatus with a length of cable, having a weight affixed to one end, and cable retrieving apparatus, having a second end of the cable adhering thereto. The boat is moved to within the length of cable, and the weight, with one end of the cable, is propelled to the boat. The cable is attached to the boat and the motor of the boat is operated into reverse sufficient to tighten the cable while a steering mechanism is operated, against the force of the cable, to align the boat with a boat trailer. The cable retrieving apparatus is activated to retrieve the cable and pull the boat to the trailer and the boat is hoisted into the trailer in a normal fashion.

19 Claims, 5 Drawing Sheets

2

BOAT DOCKING METHOD AND APPARATUS

BACKGROUND OF THE INVENTION

1. Field of the Invention

This invention relates to boat docking methods and apparatus.

More particularly, the present invention relates to improved methods of docking small boats, and apparatus for performing the docking method.

In a further and more specific aspect, the instant invention concerns a method and apparatus for docking small boats on trailers and the like.

2. Prior Art

Millions of people own private boats which they move to and from bodies of water, such as rivers, lakes, and oceans via trailers. Launching the boat into the water, from the trailer, is a fairly simple task. The trailer is driven into the water via a boat ramp or the like and the boat is allowed to slide off the trailer and into the water by gradually releasing tension on the cable of a winch generally provided on the trailer.

Retrieving the boat from the water and docking it on the trailer is much more difficult. The boat must be carefully and accurately maneuvered into alignment with the trailer and moved at least partially onto the trailer so that the winch cable can be attached and the boat can be pulled the remaining distance onto the trailer. The difficult part is getting the boat aligned, or correctly lined up with the trailer, so that it can enter the trailer without damage. If there is a crosswind, this task can be very difficult. Also, in many cases, the principal boat operator leaves the boat to retrieve and correctly position the trailer on the boat ramp or the like, leaving a less experienced person behind to align the boat and start it onto the trailer.

Maneuvering a boat at slow speed is very difficult. No directional control is available with the steering mechanism unless the propeller (screw) is developing thrust. However, once thrust is applied, the boat accelerates and is soon moving at too fast a speed for docking. To slow the boat down, reverse thrust (reverse propeller or screw) must be applied. If the steering mechanism is not moved to the correct position before applying reverse thrust, the boat turns in an unintentional direction. Very quickly, the boat is totally out of alignment with the trailer and the approach must either be abandoned and another attempt made or the boat will contact the trailer at too high a speed and/or at an incorrect angle.

It would be highly advantageous, therefore, to remedy the foregoing and other deficiencies inherent in the prior art.

Accordingly, it is an object of the present invention to provide improvements in methods of docking boats.

Another object of the present invention is to provide an improved method of docking boats which is relatively easy, routine and foolproof.

And another object of the present invention is to provide improved boat docking apparatus.

Still another object of the present invention is to provide boat docking apparatus which provides for easier, more routine and foolproof boat docking.

Yet another object of the present invention is to provide a method and improved apparatus for more easily and routinely docking boats on trailers and the like.

SUMMARY OF THE INVENTION

Briefly, to achieve the desired objects of the instant invention, in accordance with a preferred embodiment thereof, a method of docking a boat with a motor and steering mechanism is disclosed including the steps of providing boat docking apparatus including a length of cable, having a weight affixed to one end, and cable retrieving apparatus, having a second end of the cable adhering thereto, for retrieving the cable when the cable retrieving apparatus is activated, bringing the boat to be docked a distance from the boat docking apparatus less than the length of cable, propelling the weight and the one end of the cable to the boat, affixing the cable to the boat adjacent a forward portion of the boat, operating the motor of the boat into reverse to tighten the cable and operating the steering mechanism to align the boat, against the force of the cable, with a docking position at which the boat is to be docked, activating the cable retrieving apparatus to retrieve the cable and pull the boat to the docking position, and docking the boat in the docking position.

In at least one embodiment, the above method is performed using boat docking apparatus including a base, a cable having a weight affixed to one end, a cable stowing receptacle having a second end of the cable adhering thereto and including cable leveling means for stowing the cable at the receptacle in a last-in-first-out arrangement, the cable being stowed for free release from the cable stowing receptacle, up to substantially the second end, under impetus of the weight being propelled away from the cable stowing receptacle, and motor means mounted on the base and operatively connected to the cable stowing receptacle for motivating the cable stowing receptacle to stow the cable when the motor means is activated.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which.

DETAILED DESCRIPTION OF THE PREFERRED EMBODIMENTS

Figure 1:
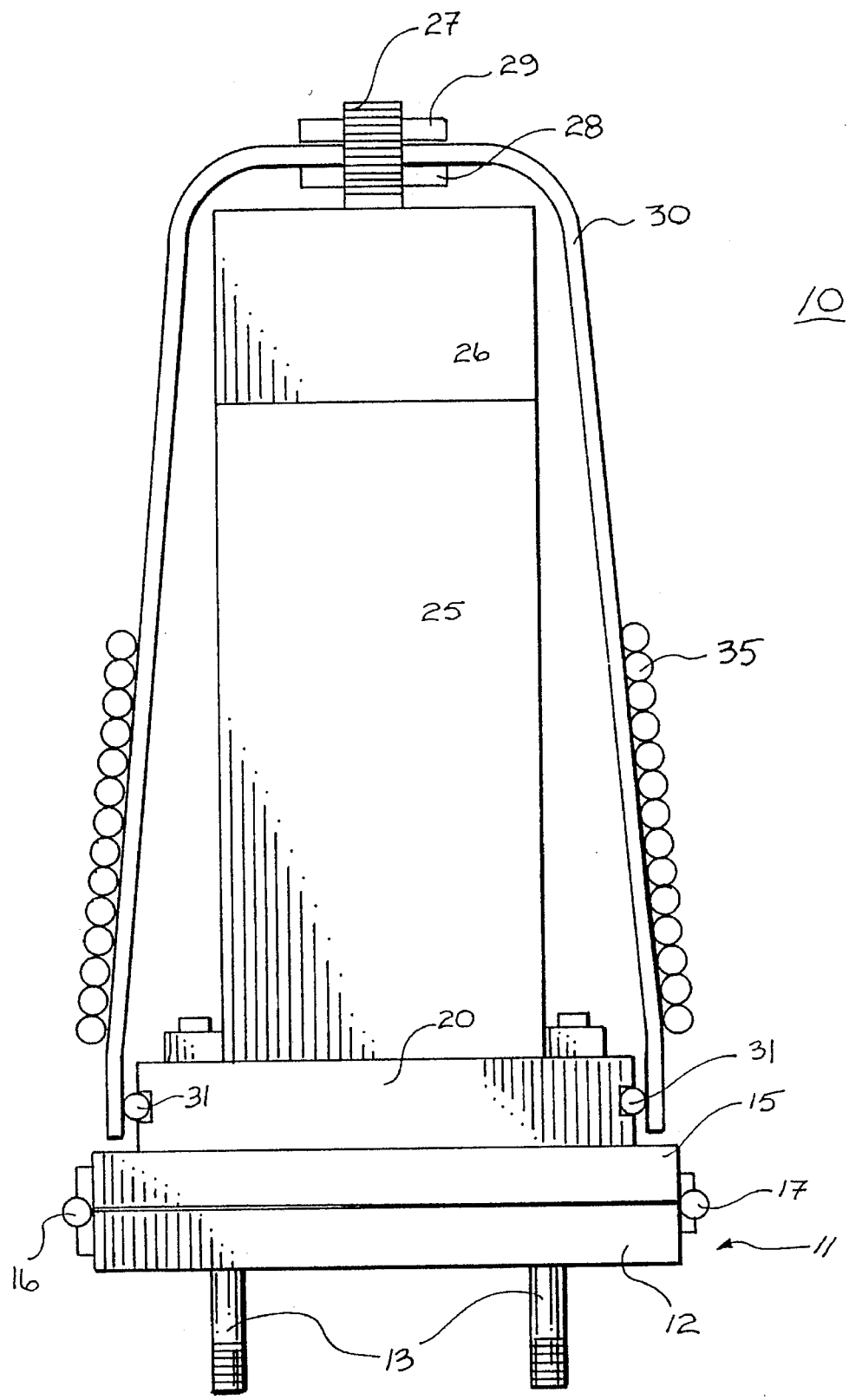
FIG. 1 is a sectional view of boat docking apparatus in accordance with the present invention.
Figure 2:
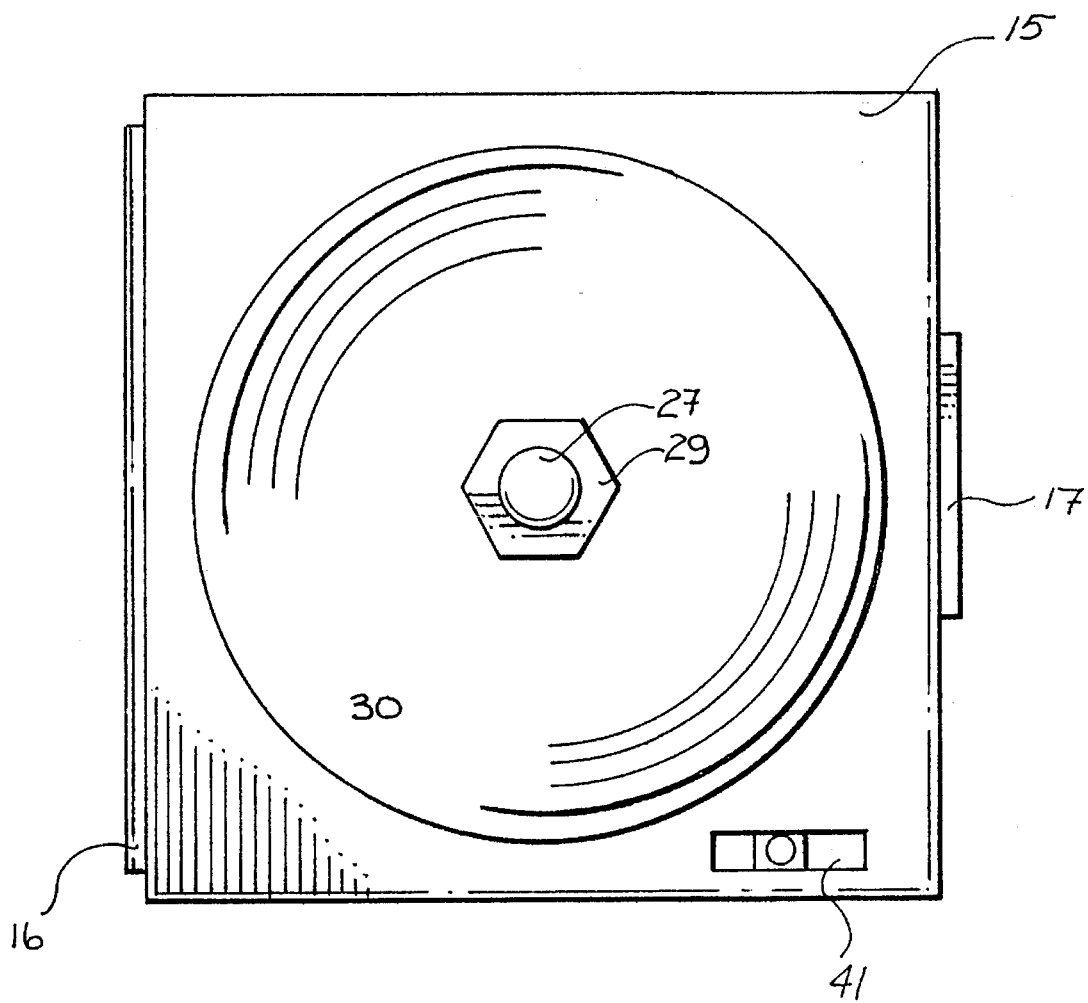
FIG. 2 is a view in top plan of apparatus illustrated in FIG. 1.

Turning now to the drawings in which like reference characters indicate corresponding elements, attention is first directed to FIGS. 1 and 2 which illustrate boat docking apparatus 10 in accordance with the present invention. Apparatus 10 includes a base 11 having a mounting portion 12 adapted to be fixedly mounted on an upper surface of a boat trailer, dock, etc. by means of mounting bolts 13. A tilting portion 15 is affixed to mounting portion 12 of base 11 by hinges 16 and normally held in a horizontal position (illustrated in FIG. 1) by means of a latch 17 or other locking mechanism. In this specific embodiment, mounting portion 12 and tilting portion 15 are simply metal plates which are positioned in parallel overlying relationship in the horizontal position, but it will be understood by those skilled in the art that either or both of these plates could be formed to fit specific surfaces of the surface upon which they are to be mounted.

A bearing plate 20 is fixedly mounted on the upper surface of tilting portion 15 for tilting movements with tilting portion 15, which will be described in more detail presently. An electric motor 25 is fixedly mounted on the upper surface of bearing plate 20 so that a rotary shaft (not shown) extends vertically upwardly into engagement with a gearhead 26. A drive shaft 27 extends vertically upwardly from gearhead 26 and is coupled to drive gears within gearhead 26 by means of a slip or friction clutch. Friction clutches of the type utilized herein are well known in the art and may be purchased, or constructed, with the amount of slippage between gearhead 26 and drive shaft 27 being adjustable or fixed at some predetermined torsional force. The end of drive shaft 27 is threaded to receive nuts 28 and 29 threadedly engaged thereon. It should be understood that the friction clutch is optional and in some applications may not be necessary. In such instances gearhead 26 may be designed to allow a certain amount of reverse movement and/or electric motor 25 may be designed with a current limiting circuit (to limit current flow through motor 25 when rotation is stopped by too large a load), which current limiting circuit will act as an electric brake while allowing limited reverse movement.

As a specific example, the gear reduction between the motor and gearhead output shaft can be on the order of 50 to 1. That is, the motor will operate at approximately 3000 RPM while the cone will rotate at approximately 60 RPM. When the cone is positioned for retrieval, the boat will be able to apply a small amount of force before the cone will start to unwind the cable due to the large gear reduction counter force. Therefore, even when the motor is not powered, the cable will not "free wheel" back off the cone once the cone is positioned in the vertical retrieval configuration. As soon as the boat operator applies reverse thrust, the trailer operator will apply power to the motor. As long as the boat reverse thrust is below the stalling force of the gearmotor, the boat will be reeled in. However, if the boat operator applies a large reverse thrust so as to align the boat with the centerline of the trailer, the motor will stall and even be rotated backwards by the force on the cable. The ultimate force that causes reverse rotation is dependent on the stall current applied to the motor. The idea is to use a solid state current limiter in series with the gearmotor. This will limit the stall current, protect the motor from burnout during stall, and will set the point at which the cone will start to turn backwards and release the cable.

Current limiters are easy to make and can even be as crude as placing a small resistor in series with the motor so as to limit the maximum current. In a specific example, a series MOSFET transistor can be used for the current limiter. This is better than a simple resistor in that the current will not be reduced but rather hard limited at its set point.

A generally conically shaped, hollow housing 30, which may be molded or otherwise formed of plastic, metal, wood, or any other convenient material, is constructed to fit over and receive therein motor 25 and gearhead 26. An opening in the upper end of housing 30 is formed to receive drive shaft 27 therethrough with housing 30 generally axially aligned around motor 25. Also, bearings 31 are mounted peripherally around bearing plate 20 and engage an inner surface of housing 30 to allow easy rotation thereof while maintaining housing 30 in the coaxial relationship. To mount housing 30, nut 28 is first threaded onto drive shaft 27 and housing 30 is positioned coaxially over drive shaft 27 so the lower edge is engaged with bearings 31. Second nut 28 is then threaded onto shaft 27 and tightened into engagement with the upper end of housing 30 to hold housing 30 fixedly in place. When motor 25 is activated, housing 30 will now rotate relatively freely with drive shaft 27 about the vertical axis defined by drive shaft 27.

A cable 35 is provided which can be any convenient material, such as rope or other flexible, light weight, non-tangling or non-snarling material which can withstand a tensile force of at least 50 pounds. One end of the cable is adhered to the outer surface of conical housing 30 by any convenient means including wound over itself, fixedly attached or tied, etc. Generally, it is preferred to adhere cable 35 to conical housing 30 so that it will come free when all of cable 35 is removed, to provide a safety feature, as will be understood more clearly presently. As a further safety feature, it is preferred that the friction clutch in gearhead 26 (or the current limiting circuit) be set to slip at a torsional force somewhat less than the maximum tensile strength of cable 35. In a specific example, one eighth inch nylon rope is utilized having a tensile strength of approximately 500 pounds and the friction clutch is set to slip at approximately 300 pounds of torsional force on housing 30.

A weight 40 is affixed to the free end of cable 35 by any convenient means, including tying, bonding, fastening, or the like. Weight 40 is heavy enough to carry cable 35 to its full length when propelled outwardly by throwing, shooting with a spring gun, etc. Also, weight 40 is padded with a soft material so as not to injure a person who is inadvertently struck with weight 40 or to damage a boat if it inadvertently strikes a surface thereof. Further, weight 40 has positive floatation characteristics, that is it will float for at least sufficient time for a boat operator to retrieve it from the water if it happens to land alongside the boat. Generally, these characteristics can be achieved with some resilient plastics which generally contain enough air, or air pockets, to provide the desired floatation characteristics. As an example, a sealed flexible plastic bag containing fine sand or lead shot and sufficient porous plastic can be utilized. Also, a weight (e.g. lead) and an attached swivel can be molded in an aerated plastic and the cable affixed to the swivel to reduce torsional stresses on cable 35 which tend to tangle or snarl cable 35, or a weight of the desired size can be simply affixed to the end of cable 35 and the entire weight and cable end molded into a surrounding plastic body.

Generally, cable 35 is stowed around conical housing 30 by adhering the free end in some fashion, such as looping a second turn thereover. Conical housing 30 is held in the vertical upright position (Seen in FIG. 1) and motor 25 is activated while maintaining a tension on cable 35. It should be understood that the vertical position for conical housing 30 is preferred, but not necessary, to ensure proper winding of cable 35 thereon. In some instances (e.g. steep boat ramps and the like) tilting portion 15 may not be horizontal (due, for example, to the boat trailer not being positioned horizontally: and some apparatus for sensing this off-vertical position and altering it may be desirable. In one embodiment a bubble type level indicator 41 is provided, for example, on the tilting portion 15, as illustrated in FIG. 2. Leveling apparatus is also optionally provided, such as providing latch 17 with multiple positions or catches. As conical housing 30 rotates each coil of cable 35 is automatically moved down the outer surface of conical housing 30 to lie in tight abutting engagement with the previous coil, as illustrated in FIG. 1. Assuming, for example, that a conical housing with an average diameter of 4 inches is used, each coil will be approximately one foot long (coil length is equal to diameter times pie). Thus, if one eighth inch nylon rope is used there will be eight coils stowed on each vertical inch of conical housing 30. Thus, to stow approximately fifty feet of cable 35 will require a housing slightly larger than six inches in vertical height. It should be specifically noted that cable 35 is stowed in a last-in-first-out arrangement on conical housing 30.

Figure 3:
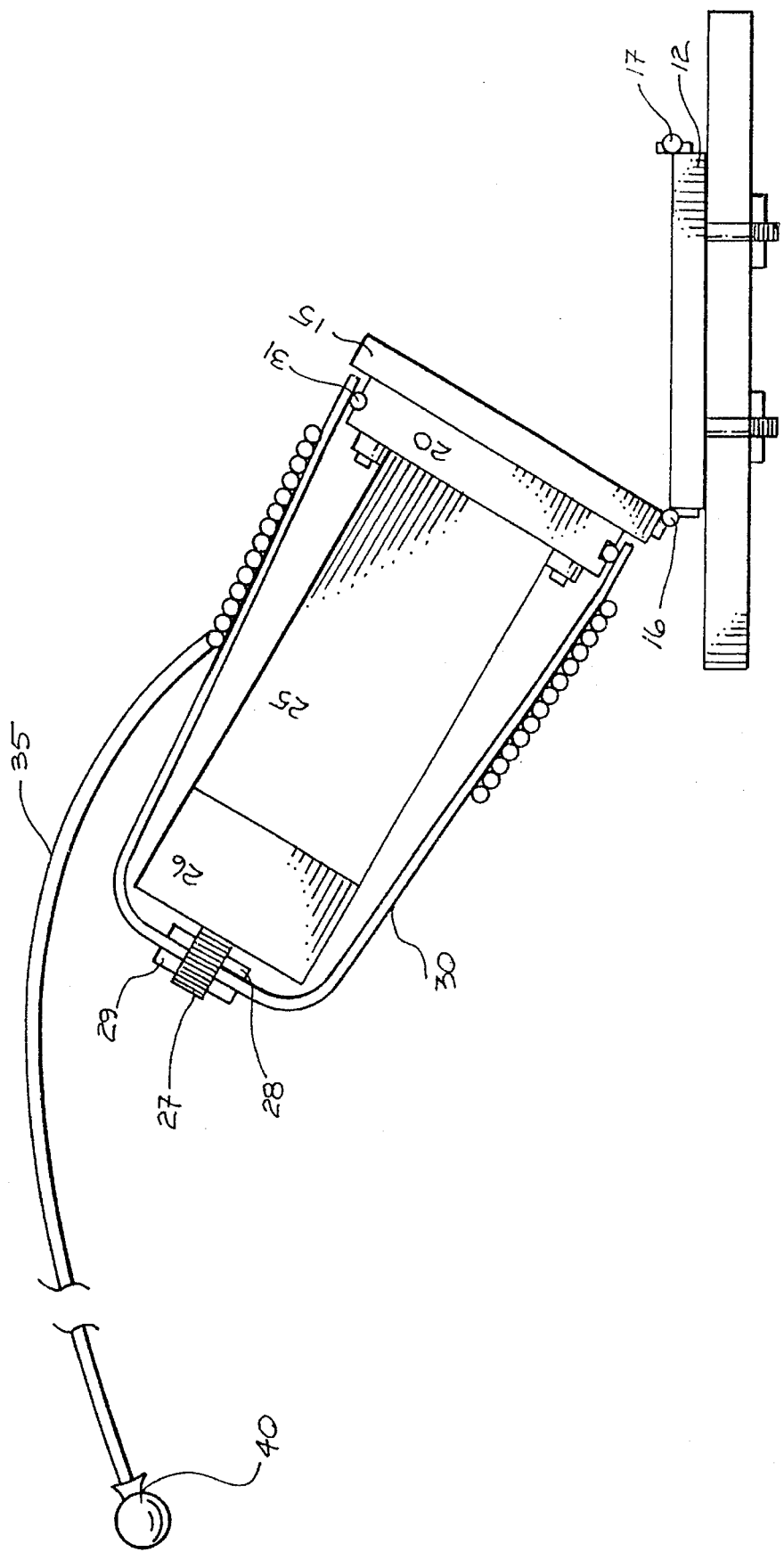
FIG. 3 is a sectional view of the apparatus illustrated in FIG. 1 in a cable deploying position.

Referring to FIG. 3, latch 17 is released and tilting portion 15 of base 11 is tilted on hinge 16 so that drive shaft 27 points at an acute angle to the horizontal, generally along the longitudinal axis of the boat trailer. In this position, conical housing 30 is positioned for free release of cable 35 from conical housing 30, up to substantially the second end, under impetus of weight 40 being propelled away from conical housing 30. Because the diameter of conical housing 30 gets smaller towards the upper end thereof, as each coil pulls free there is virtually no frictional force inhibiting the free release of the next coil. Thus, by swinging weight 40 on the end of a short portion of cable 35, or otherwise propelling weight 40 outwardly, the entire length of cable 35 can be quickly, easily and accurately deployed toward a boat.

While a specific cable stowing receptacle and motor are illustrated for exemplary purposes, it will be understood by those skilled in the art that many variations and modifications could be devised. For example, cable stowing receptacles other than conical might be utilize. Also, while motor 25 and gearhead 26 are positioned within conical housing 30 in this embodiment, to save space and protect the structure from dirt and the like, it should be understood that other embodiments, such as hand cranked gearheads, belt or frictional drives might be utilized.

Figure 4:
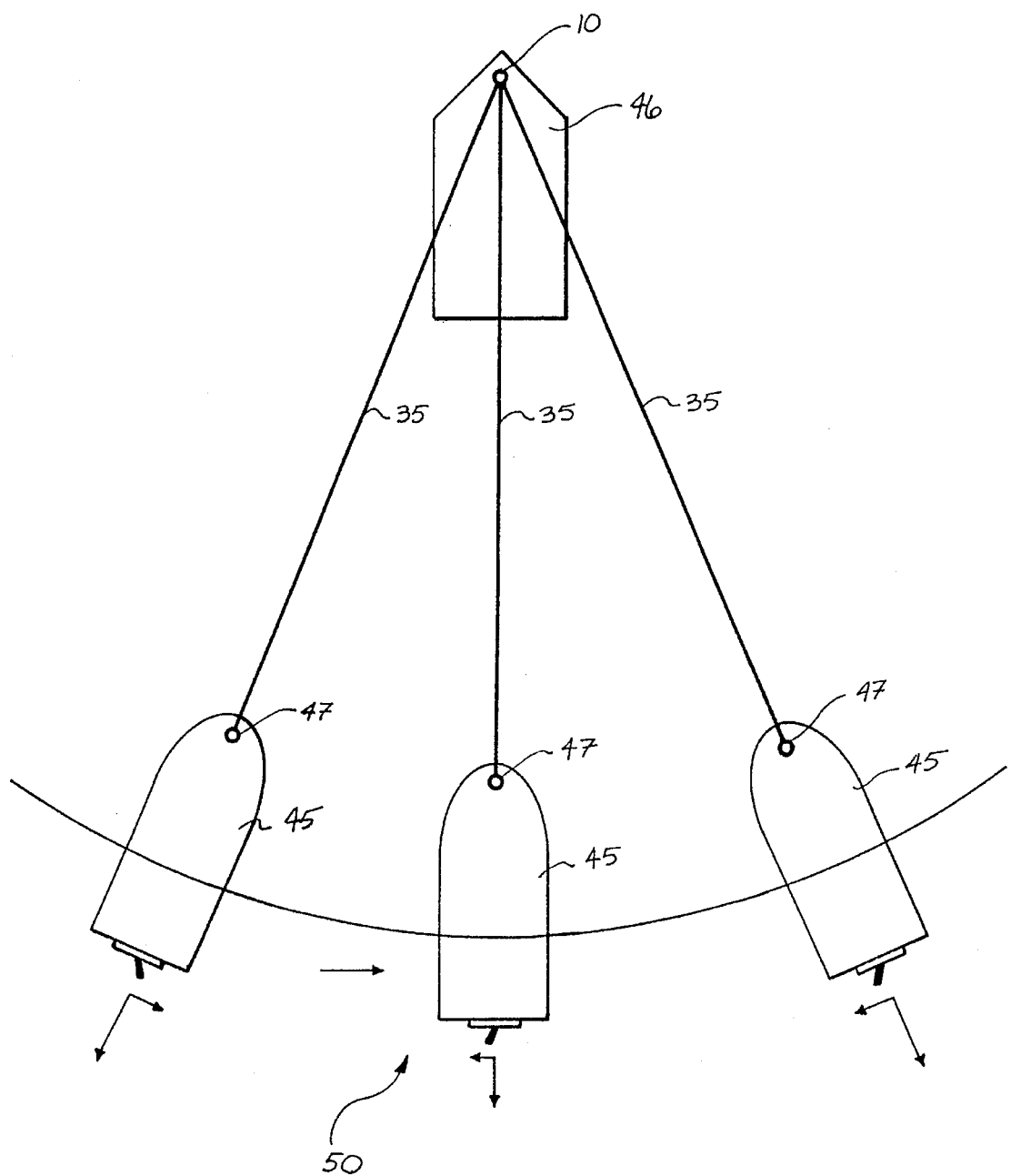
FIG. 4 is a simplified schematic view in top plan illustrating initial steps in an improved boat docking procedure in accordance with the present invention.
Figure 5:
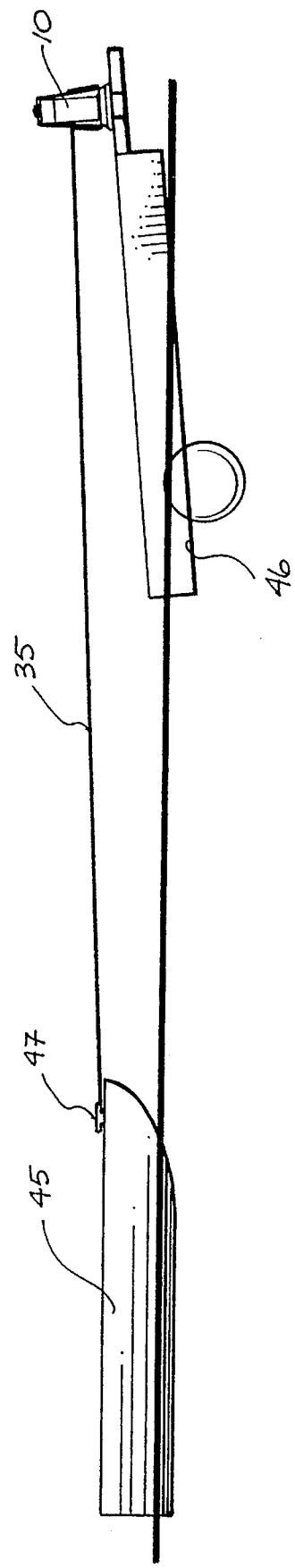
FIG. 5 is a simplified schematic view in side elevation illustrating intermediate steps of the boat docking procedure.

A novel method of docking boats is disclosed herein, which generally includes the following steps. Referring specifically to FIG. 4, a boat operator drives a boat 45 up to within a few tens of feet of a trailer 46. Generally, this is within the length of cable 35, i.e. in the above example within approximately 50 feet. The trailer operator propels (e.g. throws) weight 40 and the end of cable 35 to boat 45. Due to the free release characteristics of cable 35 from conical housing 30, lightweight cable 35 is carried by weight 40 to boat 45 without resistance or backlash. Since weight 40 is padded and floats, if the trailer operator overthrows or slightly underthrows cable 35, the boat operator simply retrieves weight 40 and the end of cable 35. If the boat operator cannot catch cable 35 the trailer operator simply retrieves cable 35 and tries until the boat operator successfully catches the free end.

The boat operator then attaches cable 35 to boat 45, adjacent the front end thereof (e.g. point 47), by means of a tie-down cleat, or other attaching mechanism. The trailer operator then moves tilting base 15 and conical housing 30 back into the vertical position (illustrated in FIG. 1). The boat operator then shifts, or otherwise places, the motor of boat 45 in reverse at low or idle speed. This causes boat 45 and cable 35 to stretch out along a straight radial path from trailer 46. By turning the steering mechanism left or right, the boat operator can use reverse prop thrust and the force of cable 35 to counteract crosswinds or to maneuver boat 45 onto a radial path along the centerline (position 50 in FIG. 4) of trailer 46. If the boat operator momentarily applies too much reverse thrust (too much tension on cable 35) the friction clutch of gearhead 26 will automatically play out additional cable 35 to prevent cable 35 from being broken.

Also, if the first end of cable 35 is adhered to housing 30 so as to be releasable, if the high tension continues for any reason, cable 35 will simply pull free of conical housing 30 and the procedure can be started again.

During the cable retrieval operation, motor 25 and gearhead 26 spin conical housing 30 thereby applying tension on cable 35 and reeling in boat 45. For small runabout type boats, up to approximately 21 feet, the force of this tension is on the order of approximately 50 to 100 pounds. The speed of the retrieval is on the order of one-half to one foot per second. These values are simply disclosed as examples and will increase or decrease with larger or smaller boats.

Once boat 45 is properly aligned, motor 25 is activated to pull boat 45 into trailer 46 along the centerline. As boat 45 is reeled in by the rotation of conical housing 30, cable 35 is automatically stowed around conical housing 30 in the position illustrated in FIG. 1. With boat 45 reeled up to, or partially onto, trailer 46, the trailer operator attaches the trailer winch to the front of boat 45 and boat 45 is winched onto trailer 46 the remaining distance in the normal fashion. It will of course be understood that it is not necessary to automatically stow cable 35 as boat 45 is reeled in along the centerline, using the present novel method. However, since most boat owners prefer to have everything ready for the next excursion, this greatly facilitates the next outing.

Accordingly, an improved method of docking boats is disclosed wherein the boat is aligned with the docking facility and gradually reeled into the facility. The present invention provides an improved method of docking boats which is relatively easy, routine and foolproof. Also, boat docking apparatus which provides for easier, more routine and foolproof boat docking is disclosed. In particular, improved apparatus for more easily and routinely docking boats on trailers and the like, utilizing the new and improved method is disclosed.

The foregoing is given by way of example only. Other modifications and variations may be made by those skilled in the art without departing from the scope of the invention as defined by the following claims.

Having fully described and disclosed the present invention and preferred embodiments thereof in such clear and concise terms as to enable those skilled in the art to understand and practice same, the invention claimed is:

1. Boat docking apparatus comprising:

a base;

a cable having a weight affixed to one end;

a cable stowing receptacle having a second end of the cable adhering thereto and including cable leveling means for stowing the cable at the receptacle in a last-in-first-out arrangement, the cable being stowed for free release from the cable stowing receptacle, up to substantially the second end, under impetus of the weight being propelled away from the cable stowing receptacle; and motor means mounted on the base and operatively connected to the cable stowing receptacle for motivating the cable stowing receptacle to stow the cable when the motor means is activated.

2. Boat docking apparatus as claimed in claim 1 wherein the cable stowing receptacle includes a generally cone shaped housing constructed to receive the cable around an outer surface thereof.

3. Boat docking apparatus as claimed in claim 2 wherein the motor means includes an electric motor with a rotatable shaft, the motor being mounted on the base with the cone shaped housing coupled to the shaft for rotation therewith.

4. Boat docking apparatus as claimed in claim 3 wherein the electric motor is constructed to fit within the cone shaped housing.

5. Boat docking apparatus as claimed in claim 3 wherein the base includes a fixed horizontal portion and a tilting portion, with the electric motor affixed to the tilting portion, the cone shaped housing being coupled to the electric motor for moving with the electric motor between a cable deploying position in which the cone shaped housing is positioned for free release of the cable from the cable stowing receptacle and a cable retrieval position in which the cone shaped housing is positioned for stowing the cable at the receptacle in a last-in-first-out arrangement.

6. Boat docking apparatus as claimed in claim 5 including in addition position sensing and leveling apparatus affixed to the base for positioning the cone shaped housing generally vertically in the cable retrieval position.

7. Boat docking apparatus as claimed in claim 1 wherein the cable is constructed for withstanding greater than 50 pounds of tensile force.

8. Boat docking apparatus as claimed in claim 7 wherein the cable includes nylon cord.

9. Boat docking apparatus as claimed in claim 1 wherein the weight is a soft padded weight having flotation and non-bounce characteristics.

10. Boat docking apparatus as claimed in claim 1 wherein the motor means includes an electric motor with a slip clutch to allow reverse movement of the cable stowing receptacle.

11. Boat docking apparatus as claimed in claim 1 wherein the motor means includes a current limiting circuit to operate as an electric brake while allowing limited reverse movement of the cable stowing receptacle during relatively high tensile forces on the cable.

12. A method of docking a boat with a motor and steering mechanism comprising the steps of:
    providing boat docking apparatus including a length of cable, having a weight affixed to one end, and cable retrieving apparatus, having a second end of the cable adhering thereto, for retrieving the cable when the cable retrieving apparatus is activated;
    bringing the boat to be docked a distance from the boat docking apparatus less than the length of cable;
    propelling the weight and the one end of the cable to the boat;
    affixing the cable to the boat adjacent a forward portion of the boat;
    operating the motor of the boat into reverse to tighten the cable and operating the steering mechanism to align the boat with a docking position at which the boat is to be docked;
    activating the cable retrieving apparatus to retrieve the cable and pull the boat to the docking position; and
    docking the boat in the docking position.

13. A method of docking a boat with a motor and steering mechanism as claimed in claim 12 wherein the step of activating the cable retrieving apparatus of the boat docking apparatus to retrieve the cable and pull the boat to the position includes intermittently operating the motor of the boat in reverse to maintain the cable tight and intermittently operating the steering mechanism to maintain the boat aligned with the docking position.

14. A method of docking a boat with a motor and steering mechanism as claimed in claim 12 wherein the step of activating the cable retrieving apparatus of the boat docking apparatus to retrieve the cable and pull the boat to the position includes continuing to operate the motor of the boat in reverse to maintain the cable tight and continuing to operate the steering mechanism to maintain the boat aligned with the docking position.

15. A method of docking a boat with a motor and steering mechanism as claimed in claim 12 wherein the step of activating the cable retrieving apparatus of the boat docking apparatus includes stowing the cable at a receptacle in a last-in-first-out arrangement.

16. A method of docking a boat with a motor and steering mechanism as claimed in claim 15 wherein the step of stowing the cable at the receptacle in the last-in-first-out arrangement includes stowing the cable for free release from the receptacle, under impetus of the weight being propelled away from the receptacle.

17. A method of docking a boat with a motor and steering mechanism on a trailer comprising the steps of:
    providing boat docking apparatus including a base affixed to the trailer and having a tilting portion movable between a cable deploying position and a cable retrieval position, a length of cable having a weight affixed to one end, a cable stowing receptacle with a generally conically shaped housing having a second end of the cable adhering thereto, the conically shaped housing operating as cable leveling means for stowing the cable thereon in a last-in-first-out arrangement, the cable being stowed for free release from the conically shaped housing, up to substantially the second end, under impetus of the weight being propelled away from the cable stowing receptacle, and motor means mounted on the tilting portion of the base and within the conically shaped housing so as to be operatively connected to the conically shaped housing for rotating the conically shaped housing to stow the cable when the motor means is activated;
    bringing the boat to be docked a distance from the boat docking apparatus less than the length of cable;
    moving the tilting portion of the base into the cable deploying position and propelling the weight and the one end of the cable to the boat;
    moving the tilting portion of the base into the cable retrieval position and affixing the cable to the boat adjacent a forward portion of the boat;
    operating the motor of the boat into reverse to tighten the cable and operating the steering mechanism to align the boat with the trailer on which the boat is to be docked;
    activating the motor of the boat docking apparatus to retrieve the cable and pull the boat to the trailer; and
    docking the boat in the trailer.

18. A method of docking a boat with a motor and steering mechanism as claimed in claim 17 wherein the step of providing the length of cable having a weight affixed to one end includes providing a length of cable having a soft padded weight with flotation and non-bounce characteristics.

19. A method of docking a boat with a motor and steering mechanism as claimed in claim 17 wherein the step of providing the motor means includes providing an electric motor with a slip clutch for allowing reverse movement of the cable during the step of activating the motor of the boat docking apparatus when force on the cable produced by the boat and motor exceeds a strain of the cable equal to a selected strain less than a maximum strain.

* * * * *